July 24, 1956  R. R. ANDERSON  2,756,000
APPARATUS FOR COMPARTMENT HEATING
Filed Dec. 24, 1953  2 Sheets-Sheet 1
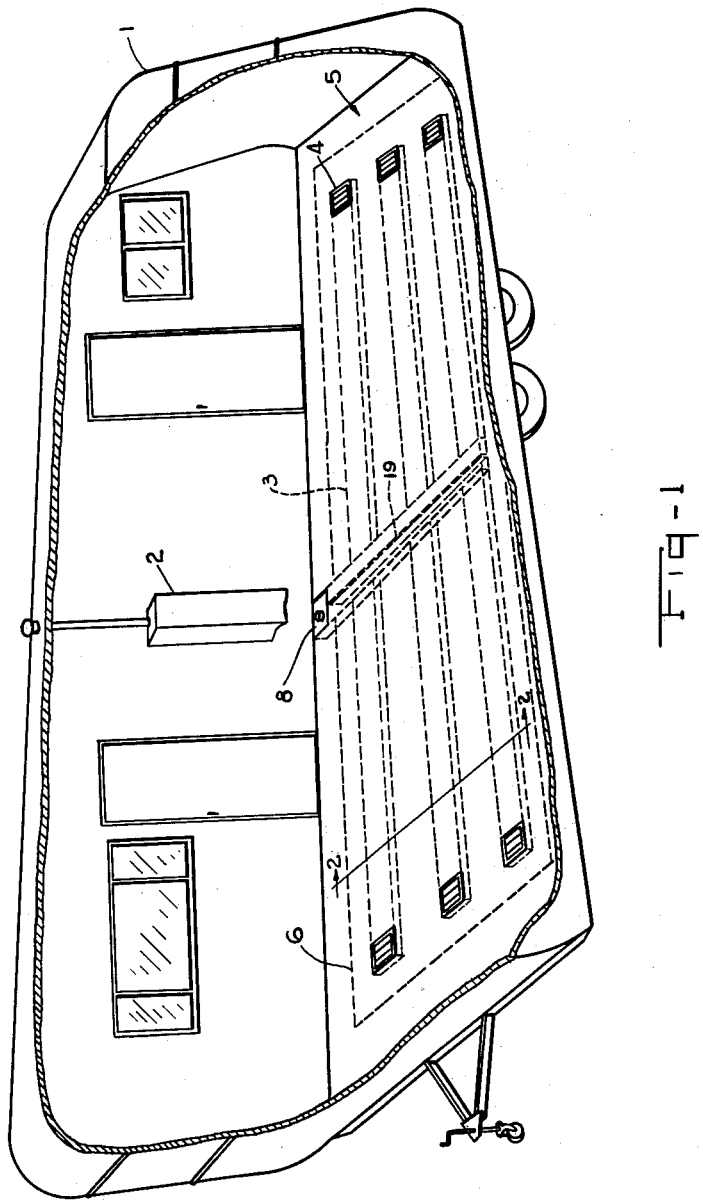
INVENTOR
Rex R. Anderson
BY Roy A. Plant
ATTORNEY July 24, 1956 R. R. ANDERSON 2,756,000
APPARATUS FOR COMPARTMENT HEATING
Filed Dec. 24, 1953 2 Sheets-Sheet 2
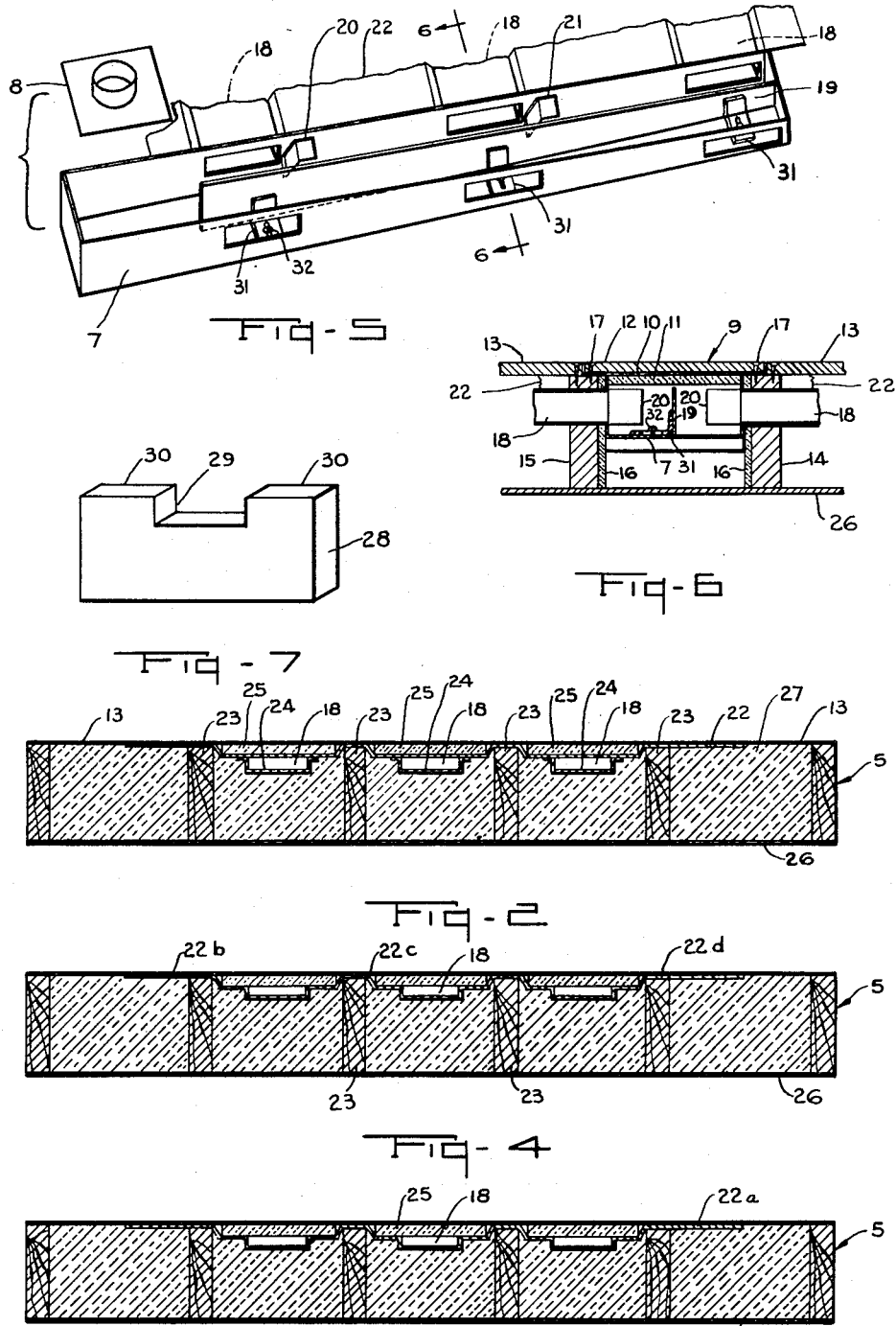
INVENTOR
Rex R. Anderson
BY Roy A. Plant
ATTORNEY

United States Patent Office 2,756,000
Patented July 24, 1956

2,756,000

APPARATUS FOR COMPARTMENT HEATING

Rex R. Anderson, Pinconning, Mich.

Application December 24, 1953, Serial No. 400,226

9 Claims. (Cl. 237—43)

The present invention relates broadly to apparatus for compartment heating, and in its specific phases to a heating apparatus particularly adapted for use in the hollow space of trailer coach floors.

Trailer coaches produced prior to 1940 were practically all constructed with insulated solid floors. Floors of that type were very satisfactory for moderate temperature use but were highly unsatisfactory in freezing weather and especially when outdoor temperatures were 15 degrees F. or lower. The floors under those conditions were so cold, even when thus insulated, that the occupants commonly wore overshoes in the trailer coach, and the floors and lower portions of the walls at the ends of the trailer coach would sweat and this would alternately freeze and thaw with variations in outdoor and indoor temperatures. This was especially aggravated in long trailer coaches as well as those having partial or full partitions dividing them into rooms. As a means of helping to solve these problems, I devised a hollow double floor trailer coach heating system with the stove connected directly to the space in such hollow floor, which was open from end to end of the trailer coach and provided with registers connected to this space at both ends of the trailer coach. With this system air could be forced in either direction to or from the stove through the hollow floor and thus completely eliminate the noted difficulties, and that system was set forth in my United States Patent No. 2,225,244.

The noted hollow floor system had certain shortcomings and particularly in that it was subject to high heat loss through the bottom panel of the floor and served to catch lint and dust which was not only highly inflammable but caused an ever present danger of dust explosion. To overcome this, I devised a metal duct system wherein the ducts were placed lengthwise of the trailer coach in the open hollow space of the floor so that heated air flowing through such duct system could be used to warm the air in such hollow space by radiation while the warmed air in the duct was being delivered to the ends of the trailer coach. That improvement was covered by my United States Patent No. 2,417,463. Such system, however, was rather uneconomical of heat since, as with my earlier construction, there was considerable heat lost out through the bottom panel of the double floor, and to overcome that situation I devised the apparatus covered by my pending United States patent application Ser. No. 131,219, filed December 5, 1949, which issued February 9, 1954, as Patent No. 2,668,666. The present invention is an improvement on the invention set forth in that patent application. It was thus a recognition of the specific problems involved in heating compartments and particularly the interior of trailer coaches, as well as the difficulties and shortcomings of the systems previously used in trailer coaches, which led to the conception and development of the present invention.

Accordingly, among the objects of the present invention is the provision of a mulitiple metal duct type heating system adapted to be installed in the hollow space between two panels, such as the upper and lower panels of a trailer coach floor, with the space under such duct work being completely filled with insulation so as to eliminate all open air spaces while positively minimizing downward radiation loss of heat through the bottom panel of the trailer coach floor.

Another object is to provide each of the multiple ducts of the present invention with a heat insulation panel between it and the panel adjacent thereto, such as the upper floor panel, to protect same from being excessively heated.

Another object is to provide each of said ducts with sidewise extending metal panel portions for supporting same, said sidewise extending portions acting to also carry heat by conduction from said ducts to slightly warm the upper floor panel which is directly adjacent and preferably in contact with a portion of said heat conducting panel remote from said duct.

Another object is to provide a multiple duct heating system in the space between the upper and lower panels of a trailer coach floor with said ducts being substantially parallel and moderately closely spaced, each duct being provided with short sidewise extending metal portions for conducting heat and providing a more uniform heating of the upper floor panel than is possible with a single duct having wide extending heat conducting portions.

Another object is to provide a hollow floor panel for a compartment, wherein there is a multiple duct heating system in said hollow floor panel with an individual heat insulating panel member above each duct, said ducts being substantially parallel, relatively thin, and having a relatively thick body of insulation below same and filling the remainder of the space in said hollow floor panel so that heat loss through the bottom of said hollow floor panel is minimized, the top portion of said panel is not overheated, and heated air may be forced through said ducts very rapidly and emerge therefrom in greater volume at a satisfactory warm temperature.

Another object is to provide a hollow floor panel for a compartment, wherein there is a multiple duct heating system in said hollow floor panel with an individual heat insulation panel for each duct, said insulation panel being at least as wide as said duct and extending substantially full length of same and acting to space said duct from the upper surface covering member of said floor panel to protect same from overheating, each of said ducts being joined by a metal panel which extends between them and for a short distance beyond the outermost ducts of said multiple duct system, said metal panel between said ducts having a portion directly below and adjacent the under face of the upper surface covering member of said hollow floor panel for conducting heat and slightly warming said supper surface covering member between said ducts and for a short distance beyond the outermost ducts of said multiple duct system.

Another object is to provide an improved distributing header member, the sides of which open into multiple tubular heating ducts in a hollow floor panel for a compartment, said header member having a removable upper cover member providing access to the inlet end of said ducts for inspection and cleaning, said cover member in the completed installation forming a portion of the finished upper portion of the hollow floor panel.

A further object is to provide an improved distributing header member, the opposite sides of which open into multiple tubular heating ducts in a hollow floor panel for a compartment, said header member having a longiudinal divider, and a removable cover member providing access to the inlet end of said ducts for inspection and cleaning, a portion of said cover member being adapted for connecting to an air heating means, such as an oil or gas operated stove, and interchangeable to fit various types of bottom output air heating means, said cover member in the completed installation forming a portion of the finished upper portion of the hollow floor panel.

A further object is to provide a hot air distributing header member for use in trailer coach hollow floors and the like, wherein said header has a removable cover member which is insulated to reduce heat conduction through same.

A further object is to provide a multiple tubular duct panel heating system for trailer coaches which is simple, an improvement over previous constructions, of relatively moderate cost, easy to manufacture and install, highly efficient in use, and safe.

Still further objects and advantages of the present invention will appear as the description proceeds.

To the accomplishment of the foregoing and related ends, the invention, then, consists of the heating means hereinafter fully described and particularly pointed out in the claims, the annexed drawings and the following description setting forth in detail certain means of carrying out the invention, such disclosed means illustrating, however, but several of the various ways in which the principle of the invention may be used.

In the annexed drawings:

Figure 1 shows a fragmentary cut-away perspective view of a trailer coach having the heating system of the present invention diagrammatically shown in the floor portion of same.

Figure 2 shows an enlarged cross sectional view taken at line 2—2 of Figure 1, looking in the direction of the arrows.

Figures 3 and 4 show modifications of the construction shown in Figure 2.

Figure 5 shows a fragmentary perspective view of a preferred form of the air distribution header of the heating system of the present invention with the main cover member removed for clarity of illustration, and with the heater connecting member shown in elevated position.

Figure 6 shows an enlarged and detailed cross sectional view taken at line 6—6 of Figure 5, looking in the direction of the arrows, but for clarity of illustration omitting the insulation in the space below the header and ducts.

Figure 7 shows an enlarged perspective view of a preferred form of duct supporting cross member, which extends crosswise of and under an individual heating duct.

Referring more particularly to Figure 1 of the drawings, it will be noted that trailer coach 1 is provided with a conventional heater 2, the bottom portion of which has been omitted to show how it is connected to a multiple tubular heating duct system 3, which has outlet registers 4 in the upper face of floor panel 5. The general area of the upper floor surface warmed through radiation and conduction of heat from heated air flowing through this heating duct system 3 in the floor panel 5, is indicated by the dashed outline 6.

The heater 2, which is of conventional construction, has an inbuilt blower fan (not shown), and opens at its bottom into a distributing header member 7, Figure 5, through a suitable connecting member 8 which acts as a cover for a portion of the open top of this distributing header member. While the closing of the top of this header member 7 can be done with a single member, I prefer to use two members with one of same being the heater connecting member 8, and the other being the main cover member 9, Figure 6, with the adjacent edges of the two forming a tight joint in accordance with conventional procedure. This main cover member preferably has a metal cover portion 10 on the under face of which is fastened a heat insulating panel 11 and above which is mounted a top member 12 which matches and forms a part of the main floor 13 of the trailer coach.

At opposite sides of distributing header member 7, Figure 6, are a pair of floor supporting members 14 and 15 with conventional sheet insulation 16 between the sides of said distributing header member 7 and said floor supporting members. In order to provide for removing the main cover member 9 whenever it is necessary to have access into said distributing header for cleaning or otherwise, conventional means, such as screws 17, are used to directly fasten the metal cover panel 10 and its top member 12 to the upper edge of said floor supporting members 14 and 15. This procedure leaves the upper exposed area of the floor in continuous usable form and at the same time makes possible the use of various heater connecting members 8 so as to adapt the assembly for utilizing the various makes and styles of bottom outlet heaters currently in use without interfering with the replacement of same with a newer model at a later time.

In order to provide for better distribution of air flowing through the distributing header member 7 into the individual ducts 18, there is provided lengthwise of the distributing header member 7 a longitudinal center partition 19 which may be adjustably spaced from the sides of the distributing header in conventional manner, as diagrammatically indicated, a variable distance to more uniformly heat the trailer coach from end to end. In other words, if the distance from the distributing header 7 to the front and rear of the trailer coach is about the same, then normally it would be preferable to space the partition 19 about equally between the sides of the distributing header 7. On the other hand, if this distributing header is nearer the forward end of the trailer coach than it is to the rear, normally this partition 19 would be moved slightly toward the forward side of the distributing header so that more air would be forced to the rear of the trailer coach to take care of the added space to be heated. The distributing header is also preferably deeper at the end connected to the heater than at its end remote therefrom, which again helps to distribute the air flow more uniformly into the individual ducts 18. Baffles 20 and 21 can also be placed in distributing header 7 at the side of each duct 18 remote from the heater and in this case where, for instance, three ducts extend out from a side of the header, the first of these baffles 20 would preferably extend a little less than one-third of the distance from the side to the center partition 19 while the second baffle 21 would extend approximately half of the way to said center partition. In actual practice it has been found that by balancing the air flow in this manner surprisingly uniform air distribution out of the registers at each end of the trailer coach is obtained.

Several different combinations of construction for the individual ducts 18 may be used and three variations of same are respectively shown in Figures 2, 3, and 4. Referring more particularly to Figures 2 and 5, it will be noted that there is a continuous heat conducting panel 22 which extends above all three of the individual ducts 18 and for a considerable distance sidewise beyond the outer two of same. This panel 22 passes over floor joist 23 and is depressed at opposite sides of such floor joist between those which contain the individual ducts 18. Fastened to the under side of this depressed portion, as by spot welding or the like, is a substantially U-shaped member 24 which forms the bottom and sides of an individual duct 18 involved.

In each depressed area above panel 22 there is placed a heat insulating member 25, of asbestos or the like, and preferably fireproof, which is wider than the width of the corresponding individual duct 18 below same. This insulating member acts to retard heat flow direct from the corresponding individual duct 18 to the main floor panel 13 directly thereabove. At the same time the heat conducting and radiating panel 22 carries heat sidewise by conduction from the individual ducts and for a considerable distance sidewise beyond the outer ducts of the group of individual ducts. A convenient material for making this heat conducting and radiating panel 22 has been found to be aluminum and, while varying thicknesses of same can be successfully used, a thickness of approximately one-thirtysecond to one-sixteenth of an inch has been found to meet most requirements. This panel 22 is also preferably directly in contact with the main floor panel 13 in the area between the heat insulating members 25 and beyond the outer side edge of the outermost of these heat insulating members. This delivers heat directly by conduction and radiation to the main floor panel 13 to make same comfortably warm over a relatively wide area.

The remaining space in the hollow floor not occupied by the distributing header and heating duct system 3 between the main floor panel 13 and bottom panel 26, which is preferably of sheet metal, is filled with a suitable insulation material 27, such as that which is purchasable on the open market under the trademark names of "Fiberglass," "Exploded Mica," "Glass Wool," or the like. The bottom panel 26 may be made out of any suitable sheet material but for most purposes sheet metal is ideal since it is water impervious. That sheet metal can be of corrosion resistant type, such as magnesium, copper, aluminum, or stainless steel, but if plain sheet iron or galvanized iron is used, it is usually preferable to coat the under face of same with a water impervious material such as the tar or asphalt base materials which are on the open market for use in protecting metals in this manner.

The construction shown in Figure 3 utilizes a modified form of heat conducting and radiating panel 22a. This panel, instead of having a U-shaped member fastened to its under side to form a duct 18 therewith, omits such separate U-shaped member 24 and is itself bent downward to replace it so that by placing the heat insulating member 25 thereover, the conventional heating duct 18 is formed. This is a simpler and cheaper type of construction than that shown in Figure 2 and in general is equally satisfactory.

The construction shown in Figure 4 is quite similar to that shown in Figure 3 with the exception that the heat conducting panel 22a instead of being of one piece construction, is in three separate pieces, 22b, 22c, and 22d, with butted edge joints substantially centered over the floor joists 23 on opposite sides of the center duct 18. This type of construction permits some flexibility of adapting the system to trailer coach floors having varying spaced lengthwise floor joists, and also permits the use of narrower strips of heat conducting panel material.

If desired, the heating ducts 18 may be supported at intervals by cross members 28, Figure 7, joined to the longitudinal floor joist 23. This support can be of various forms and the preferred type of same, which is shown in Figure 7, has a recess 29 in its upper edge into which the bottom of duct 18 can rest. The shoulders 30 at opposite sides of recess 29, in this case, would extend upward and support the portions of the heat conducting panel at opposite sides of duct 18 and thus give the entire floor construction greater rigidity.

From the foregoing, it will be seen that novel features and advantageous construction for the compartment heating or air conducting apparatus have been disclosed for attaining the desired ends, but attention is again invited to the possibility of making modifications without departing from the spirit and scope of the invention as set forth. Such directional terms as "upward," "downward," "outer," "upper," "top," "bottom," et cetera, are to be considered as explanatory and not limiting on the construction illustration and described.

Other modes of applying the principle of my invention may be employed instead of those explained, change being made as regards the means herein disclosed, provided those stated by any of the following claims or their equivalent be employed.

I therefore particularly point out and distinctly claim as my invention:

1. In a trailer coach or the like which has side and end walls, a roof, an externally exposed substantially uniform thickness double floor, the top and bottom portions of which are of tight construction and spaced apart by longitudinal joists which form a series of relatively shallow air spaces therebetween, and an air heating means, the combination therewith of an open passageway air distributing header member within and extending crosswise of the shallow air space in said floor, a cover means for said distributing header, said cover means having a heat insulating panel on its under face, the top of said cover means being flush with the top of the finished floor, means for connecting said air heating means to said distributing header for flow of air in series therethrough, a multiplicity of separate air ducts opening into and extending sidewise from at least one side of said open passageway air distributing header and lengthwise of said trailer coach, baffle means in said header at the inlet to some of said ducts to facilitate flow of air thereinto, each of said ducts having an outlet into said trailer coach at a point remote from said distributing header, said ducts being between said longitudinal joists and in the upper portion of the space between the top and bottom portions of said double floor, each of said ducts having a sidewise extending heat conducting portion and also having an upper portion which is depressed a substantial distance below the top portion of said floor, insulation filling the space between said ducts and the bottom panel of said floor, and an insulating member for the top of each of said ducts, each of said insulating members being at least as wide as the air carrying portion of said duct and substantially filling the space formed by said depression between said duct, which it covers, and the top portion of said floor, each of said insulating panels above said header and ducts being at least semi-rigid, substantially flat, and fire proof.

2. In the combination as set forth in claim 1, wherein said means for connecting the air heating means to said distributing header for flow of air in series therethrough, is at one end of said distributing header, and is removable therefrom.

3. In the combination as set forth in claim 1, wherein said distributing header is relatively deep at one end and relatively shallow at the other, and wherein said air heating means is connected to same at the deep end thereof and said connecting means is removable therefrom.

4. In a trailer coach or the like which has side and end walls, a roof, an externally exposed substantially uniform thickness double floor, the top and bottom portions of which are of tight construction and spaced apart by longitudinal joists which form a series of relatively shallow air spaces therebetween, and a heating stove, the combination therewith of an air distributing header member within and extending crosswise of the shallow air space in said floor and adjacent the top of same, a cover means for said distributing header, means for removably fastening said cover means on said distributing header, means for connecting said heating stove to said distributing header for flow of air in series therethrough, a multiplicity of separate air ducts opening into and extending sidewise from both sides of said distributing header and lengthwise of said trailer coach, each of said ducts having an outlet into said trailer coach at a point remote from said distributing header, said ducts being between said longitudinal joists in said double floor, each of said ducts having a portion which is at least as wide as the hollow portion of said duct and which is depressed a small but substantial distance below the top portion of said floor, an insulating member for each of said ducts, each of said insulating members substantially filling the space formed by said depression between said duct, which it covers, and the top portion of said floor, and a heat conducting panel means extending sidewise from each of said ducts to conduct heat therefrom and bring same to the under face of the top portion of said floor in the area alongside of said ducts to warm same.

5. In the combination as set forth in claim 4, wherein said means for connecting the heating stove to said distributing header for flow of air in series therethrough, is a separate member which is removable from said distributing header.

6. In the combination as set forth in claim 4, wherein said distributing header is deeper at one end than the other, and wherein said heating stove is connected to same at the deep end thereof by means of a separate member which is removable from said distributing header.

7. In the combination as set forth in claim 4, wherein there is a longitudinal partition in said distributing header to facilitate proportioning the air flowing through said distributing header to the multiple air ducts connected to each side of said header.

8. In a trailer coach or the like which has side and end walls, a roof, an externally exposed substantially uniform thickness double floor, the top and bottom portions of which are of tight construction and spaced apart by longitudinal joists which form a series of relatively shallow air spaces therebetween, and a heating stove, the combination therewith of an air distributing header member within and extending crosswise of the shallow air space in said floor and adjacent the top of same, a removable cover means for said distributing header, means for connecting said heating stove to said distributing header for flow of air in series therethrough, a multiplicity of separate air ducts opening into and extending sidewise from both sides of said distributing header and lengthwise of said trailer coach, each of said ducts having an outlet through the top portion of said floor into the coach interior at a point remote from said distributing header, said ducts being between said longitudinal joists in said double floor, each of said ducts being depressed a small but substantial distance below the top portion of said floor, an insulating member for each of said ducts, each of said insulating members substantially filling the space formed by said depression between said duct, which it covers, and the top portion of said floor, a heat conducting panel means extending sidewise from each of said ducts to conduct heat therefrom and bring same to the under face of the top portion of said floor in the area alongside of said ducts to warm same, and a sidewise adjustable longitudinal partition in said distributing header to facilitate proportioning the air flow through said distributing header to the multiple air ducts connected to each side of said header, and wherein said sidewise extending heat conducting panel means not only extends between ducts but sidewise beyond the outermost ducts of the group on each side of said distributing header to conduct heat from said ducts and bring same to the under face of the top portion of said floor so that a major portion of the upper panel of the trailer coach floor is warmed.

9. In a hot air heating system for trailer coaches and the like having a hollow floor with a heating means mounted thereabove, an air distributing header with multiple outlets on each side, said header being mounted in said hollow floor and having a connection for air flow therethrough in series with said heating means, said distributing header having as part thereof a removable cover means, an insulating panel at the under face of said cover means and extending substantially full width of said header from said heating means to the opposite end of said header to control the flow of heat to said cover means, a single longitudinal partition in said header to form a double passageway, each of which has multiple outlets, and means for sidewise adjusting said partition in said header to prorate the flow of hot air between the front and rear portions of the trailer coach.

References Cited in the file of this patent
UNITED STATES PATENTS

| 2,191,526 | Flogaus | Feb. 27, 1940 |
| 2,195,691 | Burt | Apr. 2, 1940 |
| 2,587,871 | May et al. | Mar. 4, 1952 |
| 2,668,666 | Anderson | Feb. 9, 1954 |